United States Patent
Kasper et al.

(10) Patent No.: US 10,329,089 B2
(45) Date of Patent: Jun. 25, 2019

(54) ORDER FULFILLMENT SYSTEM AND METHOD WITH SORTATION AT INDUCT

(71) Applicant: Dematic Corp., Grand Rapids, MI (US)

(72) Inventors: Michael J. Kasper, Jenison, MI (US); Jennifer Gonzales, Atlanta, GA (US)

(73) Assignee: Dematic Corp., Grand Rapids, MI (US)

( * ) Notice: Subject to any disclaimer, the term of this patent is extended or adjusted under 35 U.S.C. 154(b) by 0 days.

(21) Appl. No.: 15/652,555

(22) Filed: Jul. 18, 2017

(65) Prior Publication Data

US 2018/0025410 A1    Jan. 25, 2018

Related U.S. Application Data

(60) Provisional application No. 62/364,610, filed on Jul. 20, 2016.

(51) Int. Cl.
*B65G 1/137*      (2006.01)
*B65G 47/61*      (2006.01)
(Continued)

(52) U.S. Cl.
CPC ......... *B65G 1/1376* (2013.01); *B65G 1/137* (2013.01); *B65G 1/1371* (2013.01);
(Continued)

(58) Field of Classification Search
CPC .............................. B65G 1/1376; B65G 47/61
See application file for complete search history.

(56) References Cited

U.S. PATENT DOCUMENTS 4,303,503 A * 12/1981 de Mimerand ........ B65G 47/61
                                                                198/367
8,490,774 B2    7/2013 Janzen
(Continued)

FOREIGN PATENT DOCUMENTS

| EP | 2766285 B1    | 8/2014 |
|----|---------------|--------|
| WO | 2017027896 A1 | 2/2017 |
| WO | 2017027897 A1 | 2/2017 |

OTHER PUBLICATIONS

International Search Report and Written Opinion of the International Searching Authority from corresponding Patent cooperation Treaty (PCT) Application No. PCT/IB2017/054338, indicated completed on Nov. 13, 2017.

(Continued)

*Primary Examiner* — Thomas Randazzo
(74) *Attorney, Agent, or Firm* — Gardner, Linn, Burkhart & Ondersma LLP (57) ABSTRACT

An order fulfillment system and method includes storing a plurality of inventory items in a warehouse and a plurality of customer orders in a data base, wherein the inventory items make up the customer orders. Some of the orders being a single item order having only one inventory item assigned to that order and other of the orders being multiple item orders having multiple inventory items assigned to that order. Inventory items withdrawn from the warehouse are identified with an identifier and the identity of each withdrawn inventory item applied to the data base and matched item with a customer order. Inventory items are combined together that make up an order with a sortation system. The sortation system has an induct subsystem and the induction subsystem has an input. Inventory items are transported from the warehouse to the induction subsystem input with a transportation system. Inventory items assigned to multiple-item orders are forwarded to the sortation system with the induct subsystem responsive to the data base. Inventory items assigned to single item orders are forwarded to a packing station bypassing the sortation system responsive to the data base.

8 Claims, 5 Drawing Sheets

(51) Int. Cl.
*B65G 17/48* (2006.01)
*G06Q 10/08* (2012.01)
*G06Q 30/06* (2012.01)

(52) U.S. Cl.
CPC ......... *B65G 1/1378* (2013.01); *B65G 17/485* (2013.01); *B65G 47/61* (2013.01); *G06Q 10/0875* (2013.01); *G06Q 30/0635* (2013.01)

(56) References Cited

U.S. PATENT DOCUMENTS

| | | | |
|---|---|---|---|
| 8,594,834 B1 | 11/2013 | Clark et al. | |
| 8,718,814 B1* | 5/2014 | Clark | G06Q 10/08 700/214 |
| 8,798,784 B1* | 8/2014 | Clark | G06Q 10/08 198/431 |
| 8,892,240 B1 | 11/2014 | Vliet et al. | |
| 2007/0022719 A1 | 2/2007 | Berdelle-Hilge | |
| 2012/0101627 A1 | 4/2012 | Lert | |
| 2012/0216917 A1* | 8/2012 | Janzen | B65G 19/025 141/166 |
| 2015/0114798 A1 | 4/2015 | Panunto | |
| 2015/0225177 A1* | 8/2015 | Schonenberger | B65G 17/20 198/687.1 |
| 2015/0259153 A1* | 9/2015 | Buchmann | B65G 17/20 198/583 |
| 2015/0307278 A1* | 10/2015 | Wickham | G05B 15/02 700/216 |
| 2016/0009493 A1* | 1/2016 | Stevens | B65G 1/1373 700/216 |
| 2016/0016738 A1 | 1/2016 | Koetje et al. | |
| 2106/0009493 | 1/2016 | Stevens et al. | |
| 2016/0031644 A1* | 2/2016 | Schubilske | G05B 15/02 700/216 |
| 2016/0125509 A1* | 5/2016 | Carr | G06Q 30/0635 705/26.81 |
| 2016/0140488 A1* | 5/2016 | Lindbo | B65G 1/1373 705/28 |
| 2016/0229634 A1* | 8/2016 | Yamashita | B65G 1/1378 |
| 2017/0015505 A1* | 1/2017 | Schoenenberger | B65G 17/485 |

OTHER PUBLICATIONS

Prior art pouch system on sale for more than one year, DEMATIC, MonaLisa Pouch System, May 2017, USA.
Brochure disclosing MonaLisa Pouch System by Dematic, published May 2017. The MonaLisa Pouch System has been on-sale for more than one year before the priority date of the present application.
Unpublished photograph disclosing a portion of the MonaLisa Pouch System by DEMATIC.
Unpublished diagram disclosing a portion of the MonaLisa Pouch System by DEMATIC.

* cited by examiner

ORDER FULFILLMENT SYSTEM AND METHOD WITH SORTATION AT INDUCT

CROSS-REFERENCE TO RELATED APPLICATIONS

This application claims priority from U.S. patent application Ser. No. 62/364,610, filed on Jul. 20, 2016, the disclosure of which is hereby incorporated herein by reference in its entirety.

BACKGROUND OF THE INVENTION

The present invention is directed to an order fulfillment method and a system for carrying out such method and, in particular, to such method and system that is useful for processing a large number of orders in a relatively short period of time.

Order fulfillment of orders placed over the Internet must take place within a relatively short period of time in order to be commercially competitive. The same could be said for orders received by phone, facsimile or by the mail based on catalog or television-based merchandizing. Such order fulfillment is known as E-commerce and places demands on an order fulfillment system to meet such obligations. This is compounded by the fact that E-commerce usually involves a large number of small orders (each containing as few as one item in the order) that are selected from a large number of potential items. Each unique item has a specific inventory identification, known in the industry as a stock-keeping unit (SKU). Each item usually bears an optical code, such as a bar code or radio frequency identification (RFID) tag that identifies the SKU of the item.

Because of the large number of SKU's from which an order may be selected, the inventory warehouse may be very large in footprint. As such, it is common to designate geographic portions of the inventory warehouse to each be picked by an individual picker such that each picker picks only a portion of each order, since each order may be spread out over the entire general footprint of the inventory warehouse. Each picker is directed by a warehouse management system to pick portions of a number of orders using a various picking technology known in the art. It is efficient to have the picker mix several orders in one picking or picked receptacle rather than having multiple receptacles, each bearing one order portion. Also, each order may be contained in a number of picked receptacles if the order contains more than an individual item. However, it is then necessary to subsequently sort the contents of the picked receptacle(s) to the order and to process the items so that they can be packed-out for shipment via courier.

SUMMARY OF THE INVENTION

The present invention is useful with a data base that is adapted to store a plurality of customer orders and identity of inventory items that make up each of the orders. Some of the orders are single item orders. Single item orders have only one inventory item assigned to that order. Some of the orders are multiple item orders. Multiple item orders have multiple inventory items assigned to that order. While it is possible to have multiple items having the same SKU in a multiple item order it is more likely that a multiple item order contains at least multiple inventory items of different SKU's.

An order fulfillment system and method, according to an aspect of the invention, includes storing a plurality of inventory items in a warehouse and a plurality of customer orders in a data base, wherein the inventory items make up the customer orders. Some of the orders being a single item order having only one inventory item assigned to that order and other of the orders being multiple item orders having multiple inventory items assigned to that order. Inventory items withdrawn from the warehouse are identified with an identifier and the identity of each withdrawn inventory item applied to the data base and matched with a customer order. Inventory items are combined together that make up an order with a sortation system. The sortation system has an induct subsystem and the induction subsystem has an input. Inventory items are transported from the warehouse to the induction subsystem input with a transportation system. Inventory items assigned to multiple-item orders are forwarded to the sortation system with the induct subsystem responsive to the data base. Inventory items assigned to single item orders are forwarded to a packing station bypassing the sortation system responsive to the data base.

The forwarding of inventory items assigned to single item orders to a packing station may occur with the induct subsystem 13. The transportation system may transport inventory items to the induct subsystem input in bulk. The identifier may identify inventory items when picked from the inventory storage area and placed to a pick cart. The inventory items may be supplied from the pick cart to the bulk flow conveyor. The induct subsystem may include another bulk flow conveyor and the induct subsystem forwards inventory items assigned to a single-item order to the another bulk flow conveyor.

The sortation system may be a pouch sorter having individual pouches connected with an overhead conveyor with an overhead conveyor adapted to route pouches. The induct subsystem may supply inventory items making up portion of a multiple item order in a pouch and inventory items making up a single-item order to the another bulk flow conveyor. The induct subsystem may include an automated pouch opener that is responsive to the data base to open a pouch to receive an inventory item of a multiple item order and is responsive to the data base to not open a pouch for an inventory item of a single-item order. The another bulk flow conveyor may be subjacent the pouch opener wherein an inventory item supplied to a non-opened pouch falls to the another bulk flow conveyor.

The sortation system may be a pouch sorter having individual pouches connected with an overhead conveyor that is adapted to route pouches and the induct subsystem supplies inventory items making up portion of a multiple item order in a pouch. The pouch sorter may include a buffer that is adapted to accumulate pouches with inventory items therein and an accumulator that is adapted to receive inventory items from the buffer when all or a portion of inventory items that make up a multiple item order are in the buffer.

These and other objects, advantages and features of this invention will become apparent upon review of the following specification in conjunction with the drawings.

DETAILED DESCRIPTION OF THE PREFERRED EMBODIMENT

Figure 1:
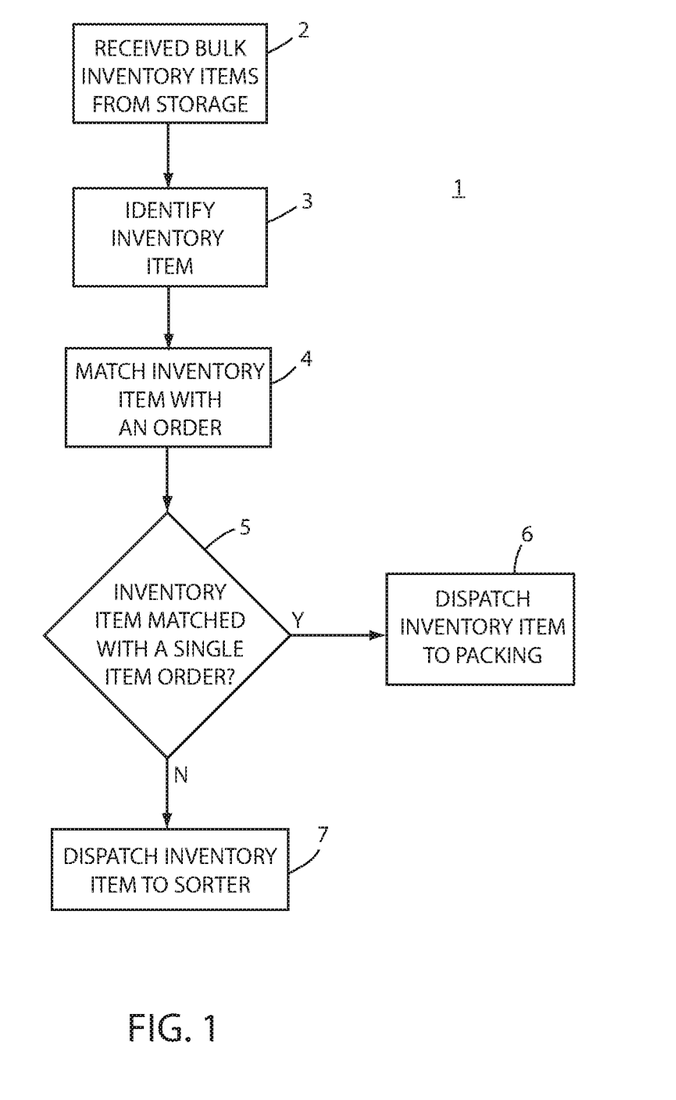
FIG. 1 is a flowchart of a method according to an embodiment of the invention.
Figure 2:
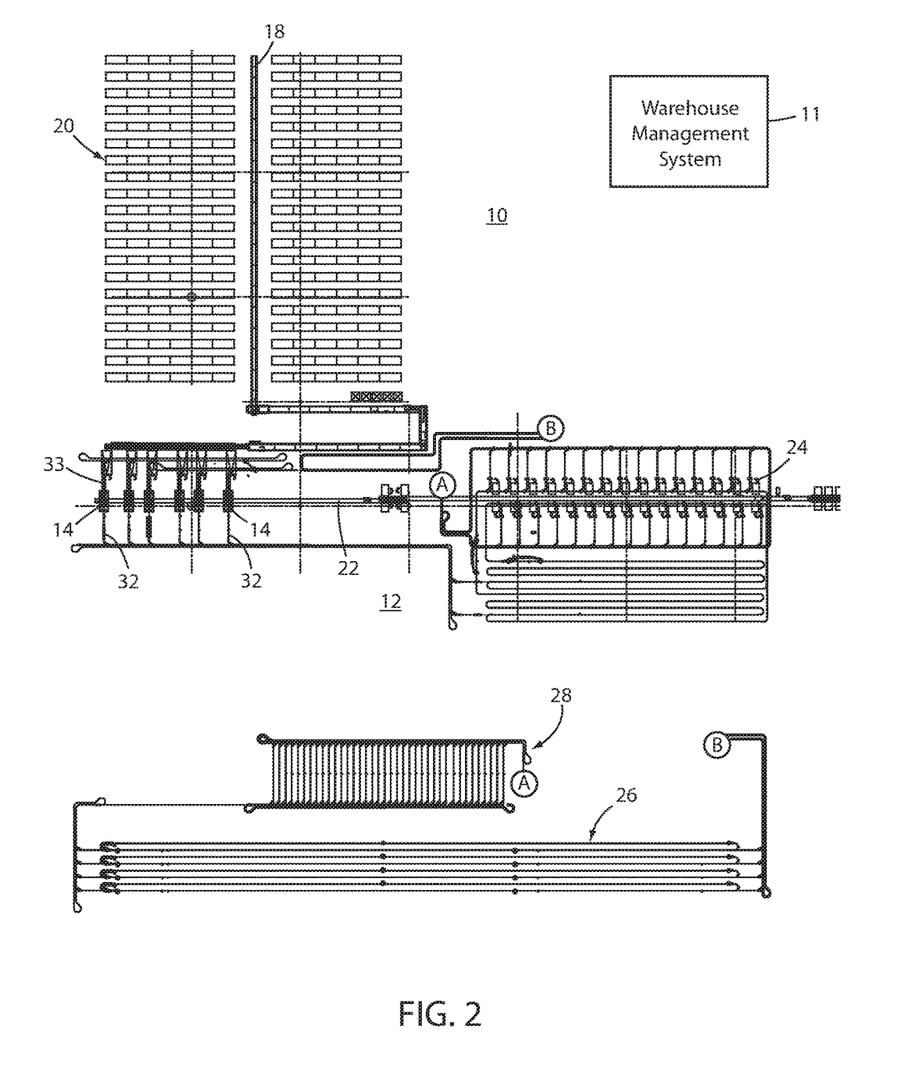
FIG. 2 is a top plan view of an order fulfillment system according to an embodiment of the invention.

Referring now to the drawings and the illustrative embodiments depicted therein, an order fulfillment method 1 receives 2 bulk inventory items from an inventory 20 which may then be supplied to a sortation system 12 by a bulk flow conveyor 18 or by other means such as pick totes, pick carts or the like and identifies 3 inventory items by using a bar code scanner, RFID scanner, optical recognition or the like (FIGS. 1 and 2). The scanned inventory item is matched with an order 4 such as by applying the SKU of the inventory items to a data base that is adapted to store a plurality of customer orders and identity of inventory items that make up each of the orders. Some of the orders may be a single item order having only one inventory item SKU assigned to that order and some of said orders may be multiple item orders having multiple inventory items assigned to that order. Method 1 is useful with a sortation system that is adapted to combine inventory items together that make up an order.

The sortation system has an induct subsystem, said induction subsystem having an input. The inventory items are supplied to the input of the induction subsystem of the sortation system. It is determined at 5 whether the inventory item is matched with a single item order. If the inventory item is matched with a single item order, the inventory item it is dispatched to packing at 6, bypassing the sortation system. If it is determined at 5 that the identified inventory item is not matched with a single item order then it is matched with a multiple item order and that inventory item is dispatched to the input of the induction subsystem of the sortation system at 7. The sortation system combines inventory items matched with each multiple item order together for customer packing. While the invention is illustrated for use with a pouch sortation system, the principles thereof may be used with other types of sortation system.

An order fulfillment system 10 shown in FIG. 2, is controlled by a warehouse management system 11 having a data base that is adapted to store a plurality of customer orders and identity of inventory items that make up each of the orders. Some of the orders are single item orders. Single item orders have only one inventory item assigned to that order. Some of the orders are multiple item orders. Multiple item orders have multiple inventory items assigned to that order. While it is possible to have multiple items having the same SKU in a multiple item order it is more likely that a multiple item order contains at least multiple inventory items of different SKU's. As such, it is possible that the items that make up a multiple item order may come from different areas in order fulfillment system 10.

Order fulfillment system 10 includes an inventory area 20 in which inventory items are stored and made available for fulfilling orders and a sortation system 12 that is adapted to combine inventory items together that make up a multiple item order. Sortation system 12 has an induct subsystem 14. Induction subsystem 14 has an input 16 in which a plurality of inventory items are supplied. These inventory item supplied to input 16 are assigned by the data base of orders to a particular order. However the items supplied to input 16 are typically assigned to a number of different orders and are supplied in bulk flow via a bulk flow conveyor 18. Bulk from conveyor 18 is fed with inventory items picked from inventory storage area 20. Inventory items are picked from inventory storage area 20 to fulfill customer orders in the data base and supplied to input 16 of induct subsystem 14 in bulk via a bulk flow conveyor 18. Inventory items are identified by an identifier and applied to the data base included with warehouse management system 11 when picked from the inventory storage area such as using a scanner that scans a barcode or RFID tag on the inventory item, or other identification technique. The inventory items may be picked manually and placed in a pick cart which is discharged to bulk flow conveyor 18. Alternatively, the inventory items may be picked using an automated picking technique such as disclosed in commonly assigned U.S. Pat. No. 9,550,624 B2 entitled Autonomous Mobile Picking, the disclosure of which is hereby incorporated herein by reference in its entirety, and supplied to bulk flow conveyor 18.

Induct subsystem 14 is responsive to the data base in warehouse management system 11 for inducting inventory items assigned to multiple-item orders to sortation system 12. Induct subsystem 14 is response to the base for sending inventory items assigned to single item orders a single-item order packing station 24. Induct subsystem 14 includes another bulk flow conveyor 22 that received inventory items assigned to a single-item order and transports the single order inventory items in bulk to packing station 24. Inventory items that make up a multiple item order are fed by induct subsystem 14 individually to sortation system 14. The separation of inventory items for single item orders and placed onto another bulk flow conveyor 22 may be done manually by an operator viewing a display screen or automatically using a robotic arm or the like. In the illustrated embodiment, separation of the inventory items for single item orders is carried out at induction subsystem 14 by the warehouse management system choosing to not open a pouch for receiving that item so that the item falls onto the another bulk flow conveyor 22.

In the illustrated embodiment, sortation system 12 is a pouch sorter of the type marketed by Dematic Corporation under the "Mona Lisa" brand. Such pouch sorter has individual pouches (not shown) connected with an overhead conveyor. The overhead conveyor includes tracks 32 that are adapted to route pouches via switches to various destinations as controlled by the warehouse management system. Each individual inventory item that goes toward making up a multiple item order is positioned in a pouch so that each pouch contains one item. The inventory items making up a multiple item order may be positioned into individual pouches using an automated induct 14 shown in FIGS. 3 and 4. Induct 14 receives empty pouches from an infeed conveyor 32 and receives inventory items from input 16 which, in the illustrated embodiment is an induct conveyor.

Figure 3:
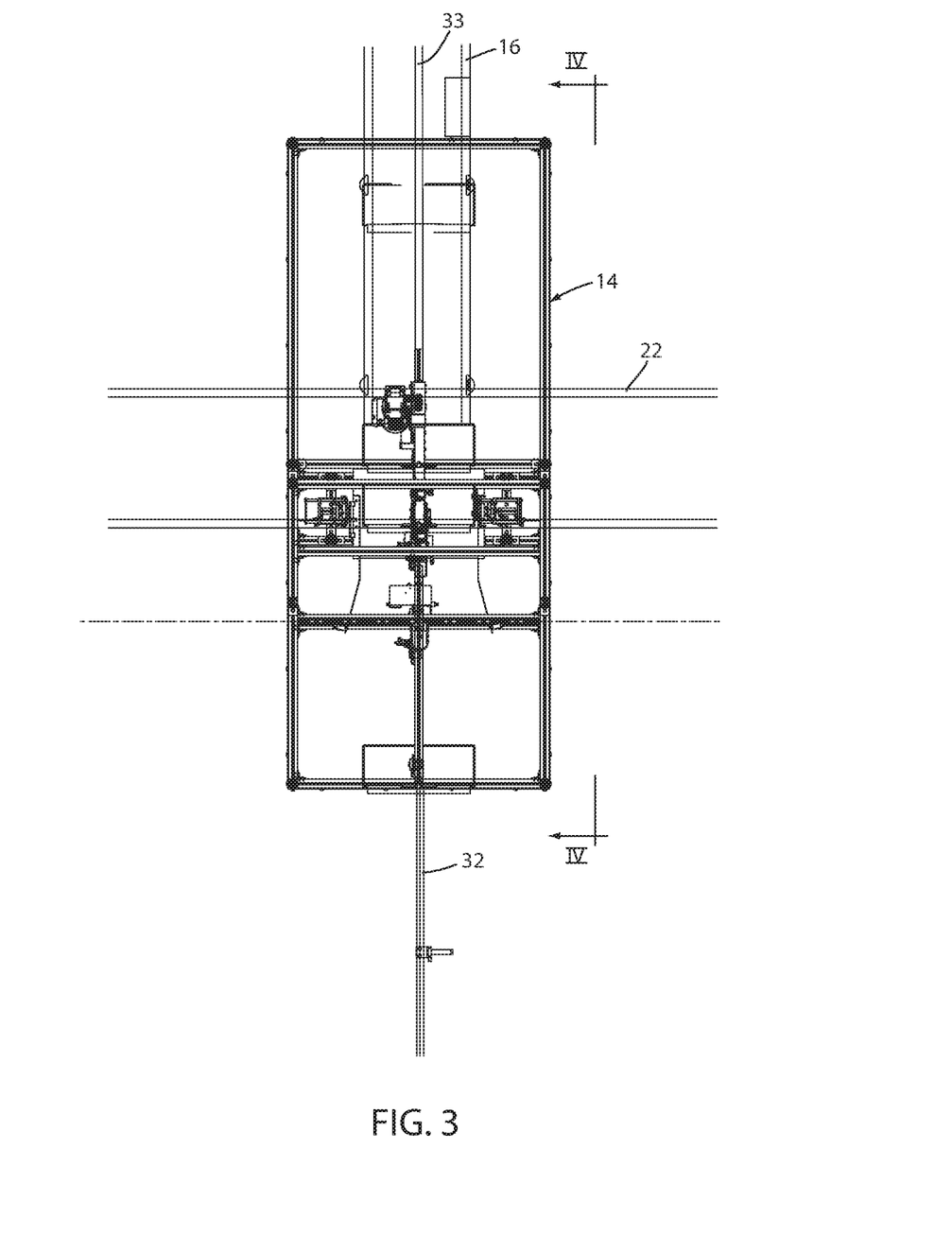
FIG. 3 is a top plan view of an induction subsystem.
Figure 4:
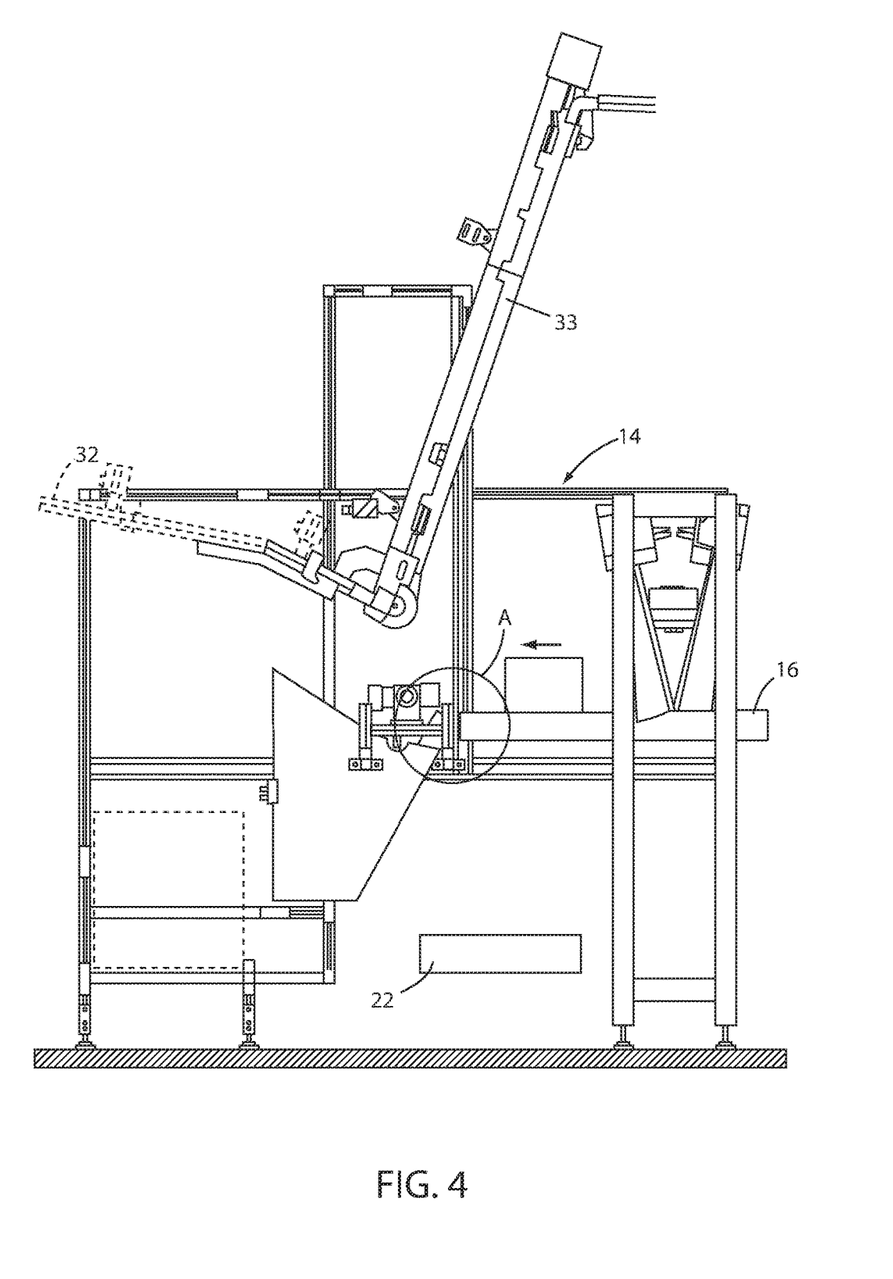
FIG. 4 is a side elevational view taken from the direction IV-IV in FIG. 3.
Figure 5:
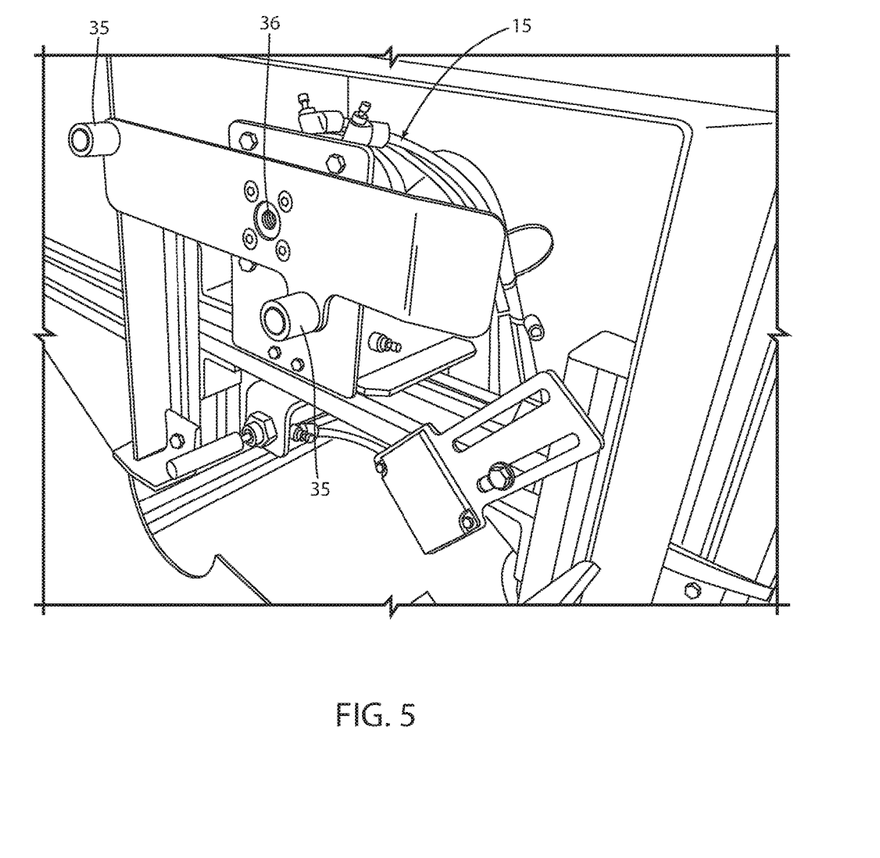
FIG. 5 is a perspective view of the area designated A in FIG. 4.

Inventory items are identified by being scanned or rescanned at input 16 using manual or automated scanning techniques. If warehouse management system determines that lead next inventory item being provided by input 16 is part of a multiple item order, the warehouse management system instructs a powered pouch opener 15 to rotate rollers 35 about an axis of rotation 36, thus opening the pouch. With the pouch opened, the next inventory item is delivered to the pouch which is then elevated using an exit conveyor 33. Since each pouch includes a unique identifier, such as a bar code, RFID chip or the like, warehouse management system 11 is able to track each inventory item through sortation system 12 by keeping track of the pouch in which that inventory item is deposited. If the warehouse management system determines that the lead inventory item provided by input 16 is matched with a single item order then warehouse management system 11 does not instruct powered pouch opener 15 to rotate. Thus the pouch will not be opened and the inventory item will fall from the downstream end of input 16 to subjacent bulk flow conveyor 22 where the inventory item will be dispatched to an available packing station 24 for packing. While illustrated as a pouch sorter, other embodiments of the invention may use other types of sorters such as cross belt sorters, Bombay sorters and the like, all of which are known in the art.

Sortation system 12 includes a buffer system 26 that is adapted to accumulate pouches with inventory items therein. Individual pouches are withdrawn from buffer system 26 and supplied an accumulator 28 that is adapted to receive inventory items in pouches from buffer system 26 when some or all inventory items that make up a multiple item order are in the buffer system. A number of multiple item orders may be combined at each spur 27 of accumulator 28. From accumulator 28, each pouch bearing an item of a multiple item order is transported to packing system 24 where the pouches for an order are emptied, such as by a packer who packs the items for shipment to the customer. By separating inventory items that make up single item orders from inventory items that make up multiple item orders prior to being supplied to the sortation system, handling of the inventory items for single items order is separate from the sortation system thus reducing handling and increasing system through put.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. An order fulfillment system, comprising:
   a warehouse that is adapted to store of plurality of inventory items and a data base adapted to store a plurality of customer orders and the inventory items making up the customer orders,
   wherein some of the orders being a single item order having only one inventory item assigned to that order and other of the orders being multiple item orders having multiple inventory items assigned to that order;
   an identifier adapted to identify inventory items withdrawn from the warehouse and to apply the identity of that inventory item to the data base for matching of that inventory item with an order;
   a sortation system that is responsive to the data base to combine inventory items together that make up an order;
   an induct subsystem having an input;
   a transportation system adapted to transport inventory items from the warehouse to said input;
   said induct subsystem being responsive to said data base to separate inventory items into individual inventory items and forward individual inventory items assigned to multiple-item orders individually to said sortation system,
   said sortation system comprising a buffer that is adapted to accumulate individual inventory items and an accumulator that is adapted to receive inventory items from said buffer when all or a portion of the inventory items that make up a multiple item order are in said buffer, wherein said sortation system comprises a pouch sorter having individual pouches connected with an overhead conveyor, said overhead conveyor adapted to route pouches, wherein said induct subsystem supplies individual inventory items making up a portion of a multiple item order to a pouch; and
   said induct subsystem being responsive to said data base to forward inventory items assigned to single item orders to a packing station bypassing said sortation system, wherein said induct subsystem includes a bulk flow conveyor and, wherein said induct subsystem sends inventory items assigned to a single-item order to said bulk flow conveyor;
   wherein said induct subsystem includes an automated pouch opener and wherein said pouch opener is responsive to said data base to open a pouch to receive an individual inventory item of a multiple item order and is responsive to said data base to not open a pouch for an inventory item of a single-item order wherein said bulk flow conveyor is subjacent said pouch opener, wherein an inventory item supplied to a non-opened pouch falls to the bulk flow conveyor.

2. The order fulfillment system as claimed in claim 1 wherein said identifier identifies inventory items when picked from said inventory storage area and placed in a pick cart.

3. The order fulfillment system as claimed in claim 1 wherein said transportation system transports inventory items to said input in bulk.

4. The order fulfillment system as claimed in claim 2 wherein inventory items are supplied from said pick cart to another bulk flow conveyor.

5. An order fulfillment method, comprising:
   storing of plurality of inventory items in a warehouse and a plurality of customer orders in a data base, wherein the inventory items make up the customer orders, wherein some of the orders being a single item order having only one inventory item assigned to that order and other of the orders being multiple item orders having multiple inventory items assigned to that order;
   identifying inventory items withdrawn from the warehouse with an identifier and applying the identity of each withdrawn inventory item to the data base and matching that inventory item with a customer order;
   combining inventory items together that make up an order with a sortation system, said sortation system having a buffer that is adapted to accumulate individual inventory items and an accumulator that is adapted to receive individual inventory items from said buffer when all or a portion of the inventory items that make up a multiple item order are in said buffer;
   transporting inventory items with a transportation system from the warehouse to an input of an induction subsystem having an input;
   separating inventory items into individual inventory items with said induction subsystem system and forwarding individual inventory items assigned to multiple-item orders individually to said sortation system with said induct subsystem responsive to said data base wherein said sortation system comprises a pouch sorter having individual pouches connected with an overhead conveyor, said overhead conveyor adapted to route pouches and wherein said induct subsystem supplies individual inventory items making up portion of a multiple item order in a pouch; and wherein said induct subsystem in response to said data base forwarding inventory items assigned to single item orders to a packing station bypassing said sortation system with a bulk flow conveyor, wherein said induct subsystem includes an automated pouch opener and wherein said pouch opener is responsive to said data base to open a pouch to receive an individual inventory item of a multiple item order and is responsive to said data base to not open a pouch for an inventory item of a single-item order wherein said bulk flow conveyor is subjacent said pouch opener wherein an inventory item supplied to a non-opened pouch falls to the bulk flow conveyor.

6. The order fulfillment method as claimed in claim 5 wherein said transportation system transports inventory items to said input in bulk.

7. The order fulfillment method as claimed in claim 6 wherein said identifier identifies inventory items when picked from said inventory storage area and placed to a pick cart.

8. The order fulfillment method as claimed in claim 7 wherein inventory items are supplied from said pick cart to another bulk flow conveyor.

* * * * *